United States Patent
Voronov et al.

(10) Patent No.: US 7,612,802 B2
(45) Date of Patent: Nov. 3, 2009

(54) CALIBRATION PIXELS FOR IMAGE SENSOR

(75) Inventors: German Voronov, Holon (IL); Eugene Fainstain, Netania (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 591 days.

(21) Appl. No.: 11/332,700

(22) Filed: Jan. 12, 2006

(65) Prior Publication Data

US 2006/0152610 A1   Jul. 13, 2006

Related U.S. Application Data

(60) Provisional application No. 60/644,118, filed on Jan. 13, 2005.

(51) Int. Cl.
 *H04N 5/225* (2006.01)
 *H04N 5/247* (2006.01)
(52) U.S. Cl. .................. 348/220.1; 348/264; 348/262
(58) Field of Classification Search .............. 348/220.1, 348/264, 262
 See application file for complete search history.

(56) References Cited

U.S. PATENT DOCUMENTS

| 4,584,598 | A | * | 4/1986 | Kutaragi ................ 348/226.1 |
| 5,682,562 | A | * | 10/1997 | Mizukoshi et al. .......... 396/159 |
| 5,732,293 | A | * | 3/1998 | Nonaka et al. .............. 396/157 |
| 6,009,282 | A | * | 12/1999 | Ishiguro et al. ............. 396/164 |
| 6,175,678 | B1 | * | 1/2001 | Sanghera et al. ........... 385/116 |
| 6,870,567 | B2 | * | 3/2005 | Funston et al. ......... 348/333.04 |
| 7,071,456 | B2 | * | 7/2006 | Poplin .................. 250/214 AL |
| 2002/0020806 | A1 | * | 2/2002 | Almi ...................... 250/227.2 |

* cited by examiner

*Primary Examiner*—James M Hannett
(74) *Attorney, Agent, or Firm*—Harness, Dickey & Pierce, PLC

(57) ABSTRACT

An imaging apparatus for capturing a still or moving picture is disclosed. The imaging apparatus includes a substrate and an aperture. The substrate includes an imaging array and a pixel. The aperture exposes the imaging array to radiation. The pixel is isolated from radiation passing through the aperture. In some embodiments, the radiation gathered by the pixel can be used to improve the still or moving picture captured by the imaging apparatus.

16 Claims, 4 Drawing Sheets

CALIBRATION PIXELS FOR IMAGE SENSOR

CROSS-REFERENCE TO RELATED APPLICATIONS

This application claims priority under 35 U.S.C. § 119 and/or 120 to U.S. Provisional Application No. 60/644,118 filed on Jan. 13, 2005.

This application incorporates by reference U.S. Application Ser. No. 60/609,195, filed on Sep. 9, 2004, entitled "Imager Flicker Compensation;" and U.S. application Ser. No. 10/474,798, filed on Oct. 8, 2003, entitled "CMOS Imager for Cellular Applications and Methods of Using Such;" each in their entirety for all purposes.

BACKGROUND

This disclosure relates in general to image capture systems and, but not by way of limitation, to digital image capture using an imaging array.

Conventional CMOS Image sensors accumulate statistics from light incident on the image array pixels. The light incident on the image array pixels typically passes through a lens. These pixels are used to gather statistical information that is used for a variety of conventional image control algorithms, most notably:

White Balance correction—adjusting the image color response to the spectrum of the light source.

Automatic Exposure/Gain Setting—increasing the exposure time and/or the gain so as to get higher contrast when there is not enough light, and to avoid saturation when there is too much light.

Backlight Compensation—increasing the contrast of a dark object of interest, when it is posed against a bright background.

Automatic Flicker Control—detection and correction of flicker phenomena, occurring when the frequency light source fluctuations is different from the scanning frequency of the camera.

Automatic Focus—moving the lens toward or away from the image sensor, so that the object of interest would be in focus.

Automatic Flash Control—controls the need to fire flash or other illumination means (auxiliary light source) in low light conditions, as well as the strength and/or duration of the auxiliary light source.

The common denominator to all the algorithms described above is that the source of the information is the captured image (i.e., the field of view visible through the lens); and, out of that, the objects which are in focus on the image sensor array. This captured image is the input that these algorithms use to perform the above algorithms.

Camera or imaging modules are being embedded into all kinds of devices, for example, phones and computer displays. The quality of these camera modules continues to advance. The camera module includes an image sensor and digital processing of the information gathered from that image sensor. A processed digital signal is produced by the camera module to convey the digital pictures, video and/or control information with the device embedding the camera module.

BRIEF DESCRIPTION OF THE DRAWINGS

The present disclosure is described in conjunction with the appended figures.

Figure 1:
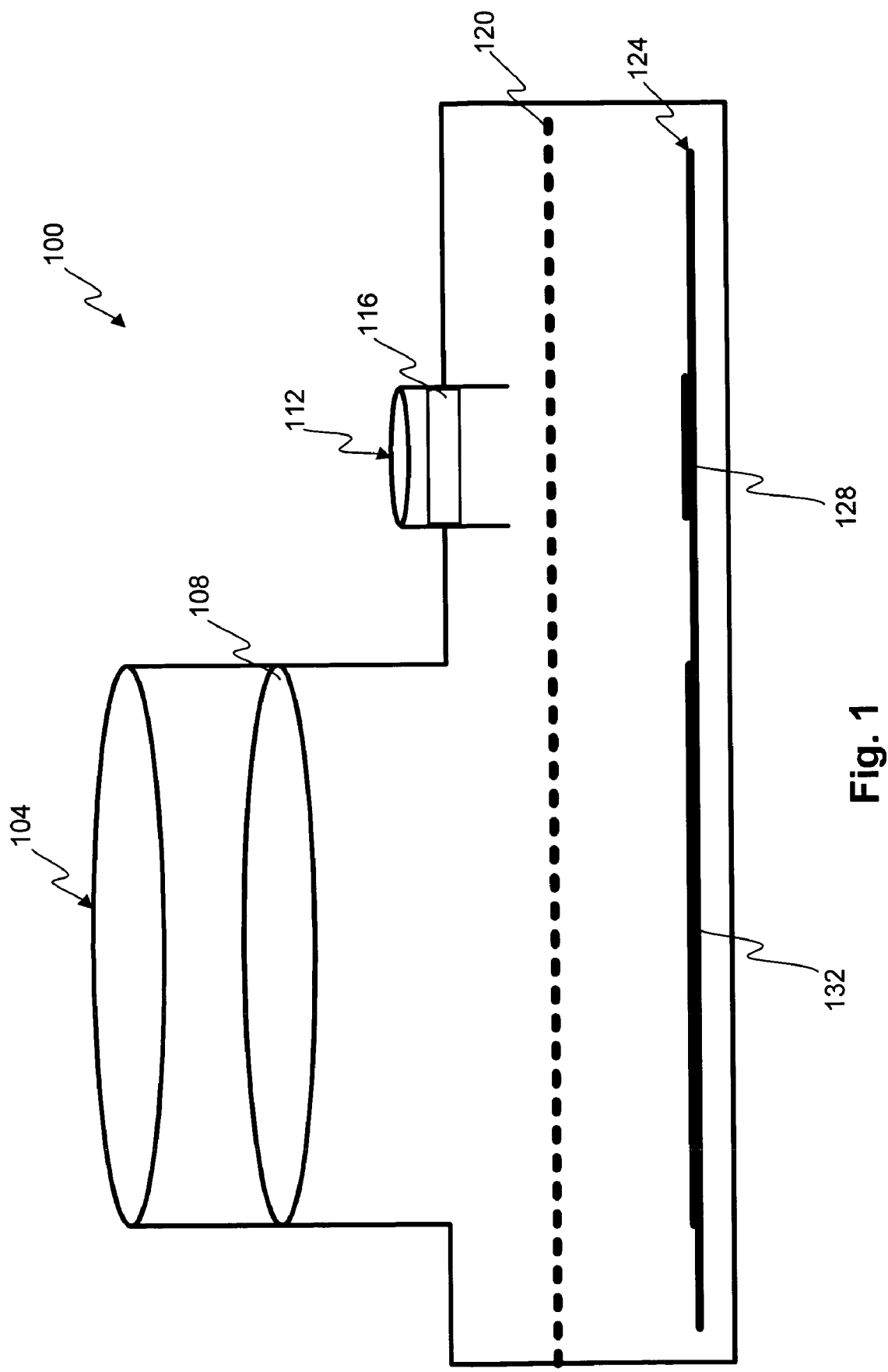
FIG. 1 depicts a block diagram of an embodiment of an imaging system.

In the appended figures, similar components and/or features may have the same reference label. Where the reference label is used in the specification, the description is applicable to any one of the similar components having the same reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Furthermore, portions of embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks.

Many algorithms performed in a camera or imaging module could use global scene information, on top of or instead of the information conveyed through the lens. In particular:

White balance could be done using global scene information if the source of the information would consist of ambient light, rather than information available in the conventional method (as is generally the case in through-the-lens white balance).

Automatic exposure could be done using global scene information if the algorithm "knows" what the total illumination in the scene is. For example, on a cloudy day we want the objects in the scene to look darker. Conventional through-the-lens algorithms increase their brightness on a cloudy day so the image would look bright and shiny.

Backlight compensation may be avoided in one embodiment if the exposure is adjusted according to the scene average rather than the limited field of view image average available with through-the-lens algorithms. By comparing the content of the active pixels (through-the-lens field of view) to the scene average, we can determine backlight compensation more accurately by modeling the human eye.

Flicker is much easier detected if temporal variation of the light source is determined in one embodiment rather than using only the reflected image as is done with through-the-lens algorithms.

Automatic Flash control may benefit from one or more calibration pixels in a number of ways, such as:

Measuring illumination level to decide to apply auxiliary light source or not.

During frame capture when auxiliary light source is active, calibration pixels may collect the light coming from illuminated scene and report when the enough light was collected to turn the auxiliary light source off. This can be implemented by using a programmable controller that reads the value of special pixels; or the output of special pixels can be connected to the auxiliary light source switch through a decision circuit.

In one embodiment, special or calibration pixels 128 are implemented in order to provide additional metering of scene properties. Calibration pixels 128 are optically-isolated pixels located on the same chip or substrate 124 as the active pixels of the image array 132. The light radiation that is incident on these calibration pixel(s) 128 travels through different optical channel 112 than the light radiation incident on the active pixel array 132, as shown in FIG. 1. The radiation incident on the active pixel array 132 travels through an optical channel 104 that uses a lens 108. These calibration pixels 128 may have different design, optical and electrical properties. In one embodiment, the optical channel 112 for the calibration pixel 128 does not use a lens, but does use a diffuser 116.

In this embodiment, the active pixel array 132 and the calibration pixels 128 are monolithically integrated into the same substrate 124. This substrate 124 may also include analog processing circuits 304 and/or digital signal processing circuits 308 in other embodiments, as shown in FIG. 3 through FIG. 6. An alternative embodiment adds either the active pixel array 132 or the calibration pixels 128 to a substrate 124 containing the other. For example, a hybrid chip could be formed by bonding the calibration pixels 128 to a substrate 124 containing the active pixel array 132, or vice versa. An IR cut filter 120 may be part of the camera module 100 to filter one or both optical paths 104, 112.

Figure 2:
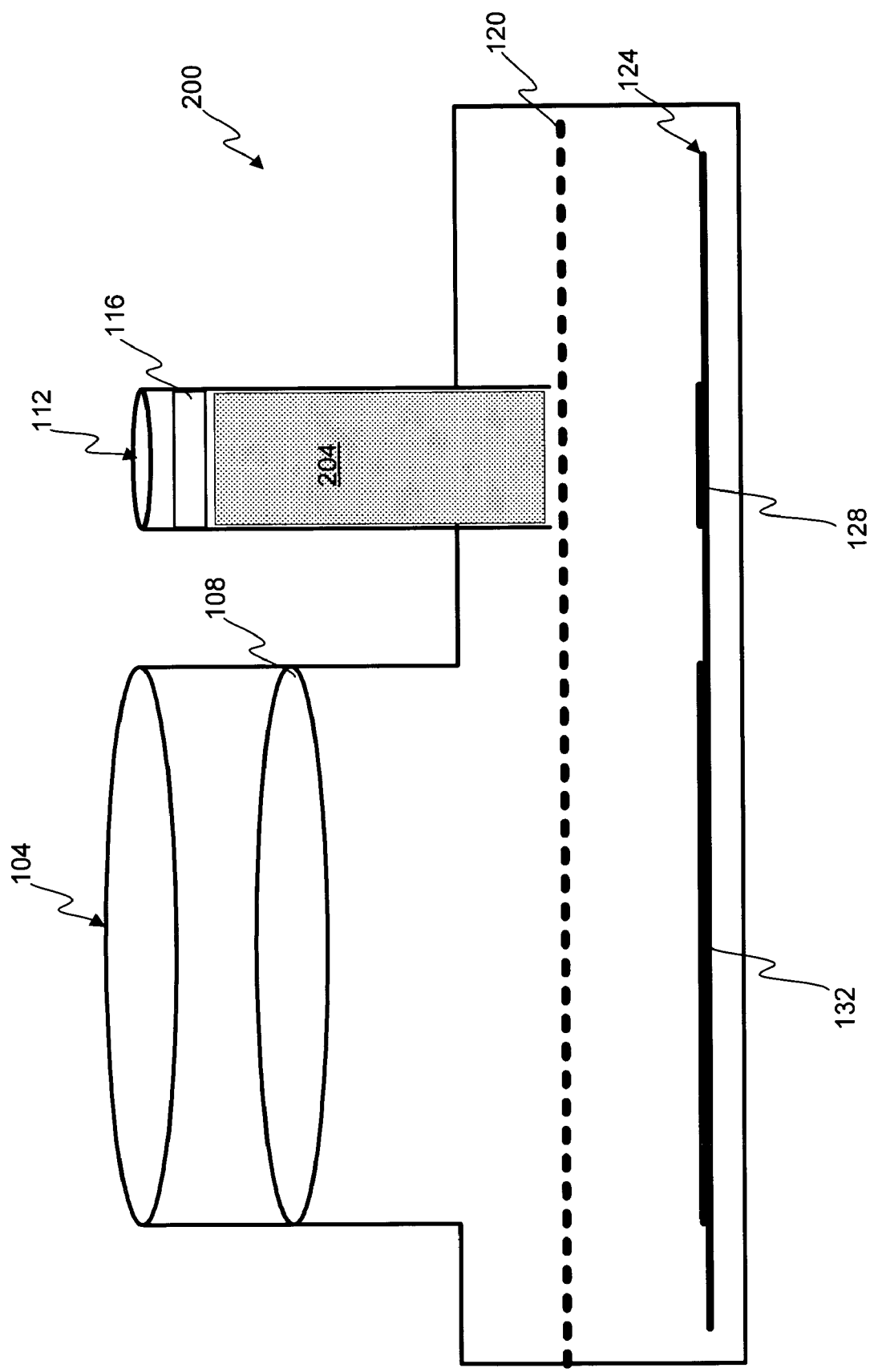
FIG. 2 depicts a block diagram of an embodiment of the imaging system that extends the optical path of special pixels.
Figure 3:
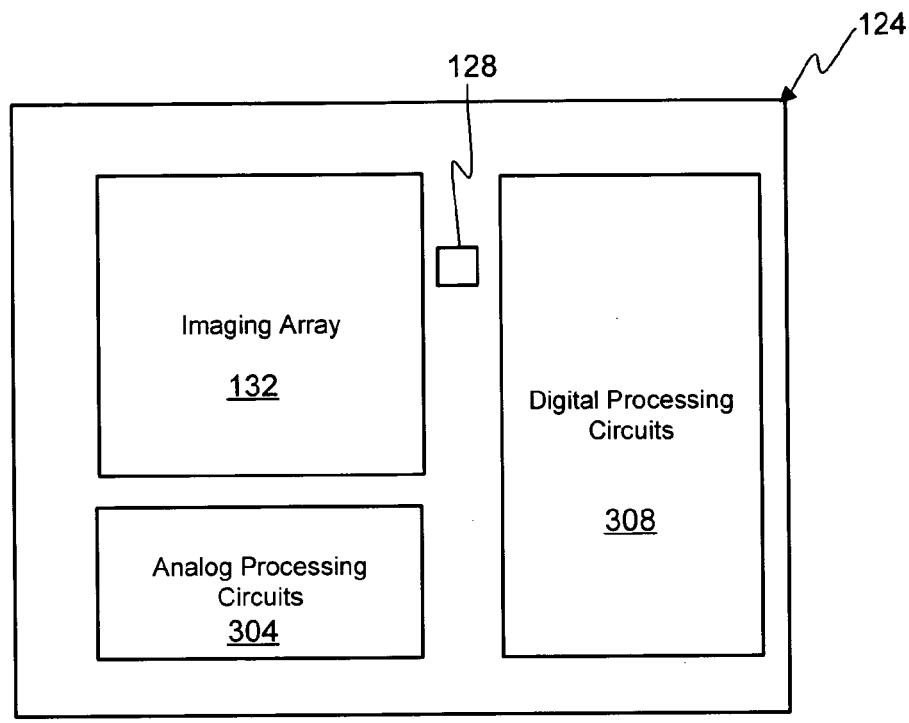
FIG. 3 depicts a block diagram of an embodiment of a substrate.
Figure 4:
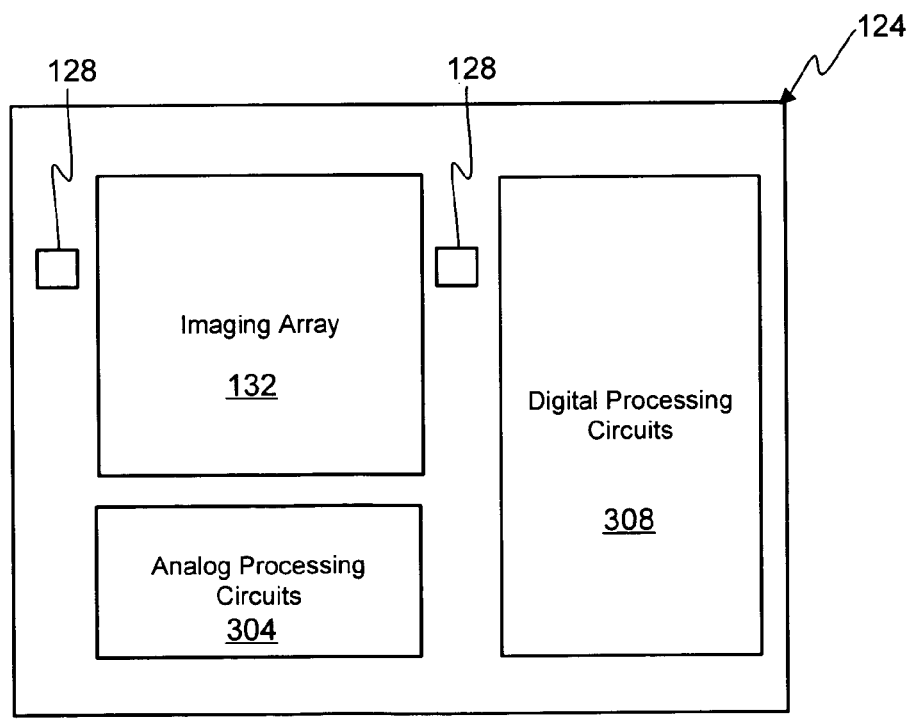
FIG. 4 depicts a block diagram of another embodiment of the substrate that includes two calibration pixels that may or may not be optically isolated from each other.
Figure 5:
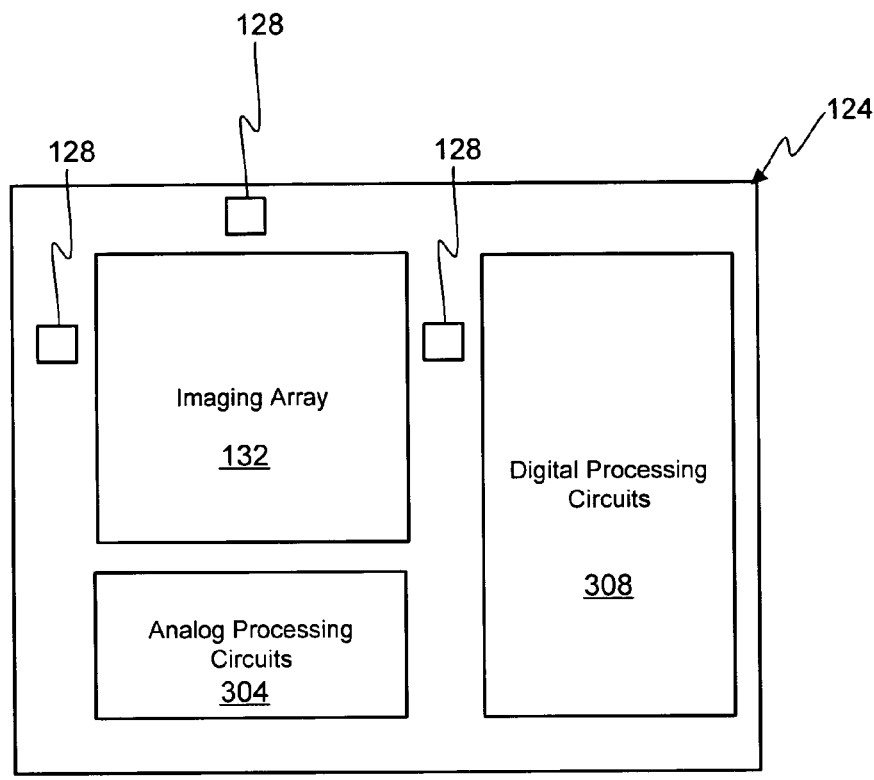
FIG. 5 depicts a block diagram of yet another embodiment of the substrate that has three calibration pixels in different locations.

The individual optical path 112 for the calibration pixel(s) 128 may be extended to approximately a height of the sensor lens height, as depicted on FIG. 2. An optical fiber(s) or optical waveguide 204 can be employed to guide the light to the calibration pixel(s) 128. This alternative embodiment can be used when designing an imaging module 200 to be integrated in an application where the lens 108 and diffuser surface are largely flat, such as a mobile phone. The diffuser 116, in one embodiment, is formed by scuffing or scratching one end of the optical fiber 204.

Figure 6:
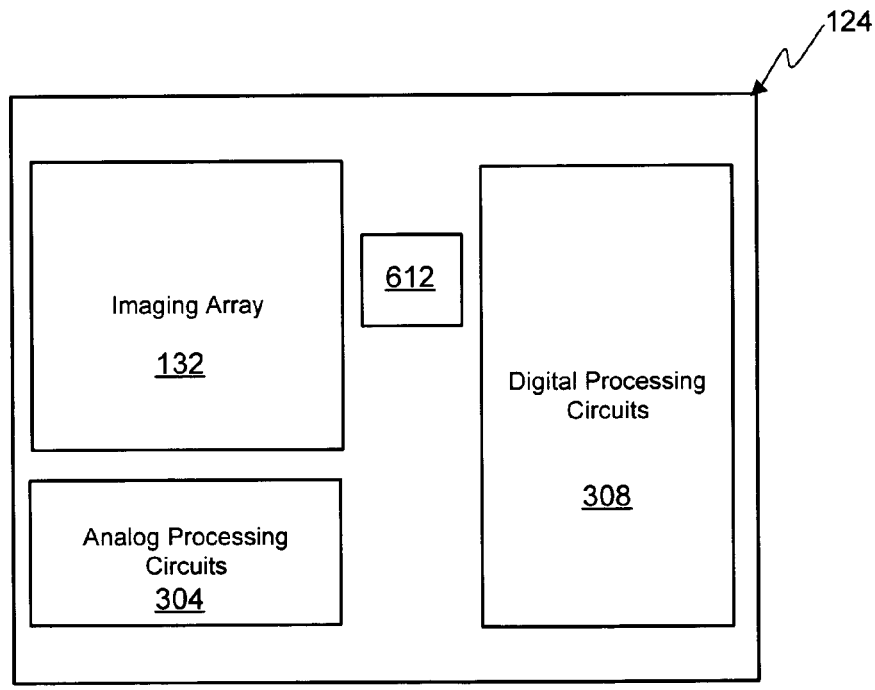
FIG. 6 depicts a block diagram of still another embodiment of the substrate that uses an array or line of calibration pixels.

There could be a number of calibration pixels 612 arranged in a line or array in various embodiments. For example, FIG. 6 shows use of an array of calibration pixels 612. Another embodiment could have calibration pixels 612 arranged in a line. There could be multiple lines or arrays of calibration pixels 612 placed together or scattered on the substrate 124. Some embodiments could have some single calibration pixels 128 and arrays 612 variously placed on the substrate 124, with or without isolation of radiation from each other.

Special pixels 128 may or may not be designed to include color filters, so there will be different color types of special pixels 128. Differently colored special pixels 128 may provide spectral information of the illumination present in the scene. The color filters used on special pixels 128 may be equivalent to normal pixels, or be extended to include additional color ranges (not just 3 or 4 different colors—but more, say 8 to 10).

The special or calibration pixels 128 can be used for a variety of functions. Various embodiments could use the calibration pixels 128 for one or more of the following, for example:

1. Measuring of the ambient illumination strength.
2. Measuring of spectral components of the illumination.
3. Measuring of the illumination signal, e.g. fluorescent light periodic response.
4. Measuring of the collected light amount, for mechanical shutter control, flash duration etc.

There can be different calibration pixels 128 to measure different parameters. Some could be optimized one function, while others are optimized for another. Some embodiments could have multiple groups of calibration pixels 612 that are optically isolated from each other or not. The groups 612 could measure different parameters using different lenses, diffusers, optical waveguides, and/or filters. Some embodiments could have groups of pixels 128 assigned to different parts of the image by use of lenses. For example, FIG. 4 and FIG. 5 respectively show use of two or three different groups of calibration pixels 128 that may or may not be optically isolated from each other and could use different lenses to focus on different parts of the image.

Various embodiments could exhibit one or more of the following:

1. Actual metering of the ambient illumination strength, not the reflected light. This may be employed by automatic exposure algorithms to distinguish between a dark object under strong illumination of a bright object under weak lighting.
2. Metering of the actual illumination spectrum. This can be used by automatic white balance to cancel out the effect of illumination type. Wider (and finer) spectral coverage (by using more than 3 or 4 different color-filters) can be used to identify the illuminant type more accurately—thus possibly better White Balance algorithm performance.
3. If these pixels are read out every row (or several rows), it will enable passive flicker estimation and cancellation, such as that described in U.S. application Ser. No. 10/474,798, filed on Oct. 8, 2003, entitled "CMOS Imager for Cellular Applications and Methods of Using Such."
4. If these calibration pixels are read out every row (or several rows) it will enable active flicker estimation and even compensation, such as that described in U.S. Application Ser. No. 60/609,195, filed on Sep. 9, 2004, entitled "Imager Flicker Compensation."
5. Flash/mechanical shutter duration may be also controlled by the values of these pixels.
6. Automatic algorithms may be simplified, reduce software code size and improve robustness in one embodiment. The parameter tuning is also simplified, contributing to time-to-market and uniformity between software for different chips.

A number of variations and modifications of the disclosed embodiments can also be used. For example, some embodiments separate the diffuser from the substrate, but others could bond or form the diffuser directly onto the substrate. The special pixels could be separated some distance from the active pixels or could be immediately adjacent.

The techniques described herein may be implemented by various means. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques, processes and functions described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

While the principles of the disclosure have been described above in connection with specific apparatuses and methods, it is to be clearly understood that this description is made only by way of example and not as limitation on the scope of the disclosure.

What is claimed is:

1. An imaging apparatus for capturing a still or moving picture, the imaging apparatus comprising:
    a substrate including
        an imaging array, and a pixel;
    a body including
        first and second apertures, the first aperture exposing the imaging array to radiation, the first aperture including a lens, the second aperture exposing the pixel to radiation, the second aperture including a diffuser and not including a lens,
    wherein, the pixel is isolated from radiation passing through the first aperture, and the imaging array and the pixel are part of the substrate.

2. The imaging apparatus for capturing the still or moving picture as recited in claim 1, wherein the substrate is substantially comprised of semiconductor material.

3. The imaging apparatus for capturing the still or moving picture as recited in claim 1, wherein the imaging array is configured to sense a still or moving picture based on the pixel.

4. The imaging apparatus for capturing the still or moving picture as recited in claim 1, wherein the imaging array and the pixel are a monolithic part of the substrate.

5. The imaging apparatus for capturing the still or moving picture as recited in claim 1, wherein the substrate further comprises digital signal processing circuitry that processes information produced by at least one of the imaging array or the pixel.

6. The imaging apparatus for capturing the still or moving picture as recited in claim 1, further comprising an optical fiber guide, wherein the optical fiber guide optically couples the pixel with the radiation.

7. The imaging apparatus for capturing the still or moving picture as recited in claim 1, further comprising a plurality of pixels isolated from the radiation passing through the aperture, wherein the pixel is part of the plurality of pixels.

8. The imaging apparatus for capturing the still or moving picture as recited in claim 1, wherein the pixel affects information gathered by the imaging array.

9. The imaging apparatus for capturing the still or moving picture as recited in claim 1, wherein the pixel does not form an image pixel in an image produced by the imaging sensor.

10. An imaging module for capturing still or moving pictures, the imaging module comprising:
    an imaging array;
    a first pixel configured to receive radiation and perform a first radiation measurement;
    a second pixel configured to receive radiation and perform a second radiation measurement;
    a body including an aperture, the aperture being configured to expose at least the imaging array to radiation,
    wherein
        the first and second pixels are isolated from radiation passing through the first aperture, the imaging array and the first and second pixels are coupled together by a substrate, the first and second pixels are arranged on different portions of the substrate, and the first and second radiation measurements measure different aspects of radiation.

11. The imaging module for capturing still or moving pictures as recited in claim 10, wherein the imaging array is configured to sense a still or moving picture based on at least one of the first and second pixels.

12. The imaging module for capturing still or moving pictures as recited in claim 10, wherein the substrate further comprises digital signal processing circuitry that processes information produced by at least one of the imaging array or the pixel.

13. The imaging module for capturing still or moving pictures as recited in claim 10, wherein the first and second pixels are part of a plurality of pixels grouped together.

14. The imaging module for capturing still or moving pictures as recited in claim 10, wherein at least one of the first and second pixels affects information gathered by the imaging array.

15. A method for capturing still or moving pictures, the method comprising the steps of:
    receiving first radiation with a first pixel;
    performing a first measurement of the first radiation;
    receiving second radiation with a second pixel;
    performing a second measurement of the second radiation, the first and second measurements measuring different aspects of radiation;
    receiving third radiation from a first aperture with an imaging array, the first and second pixels being isolated from the third radiation, the first and second pixels and the imaging array being coupled together by a substrate;
    capturing a still or moving picture with the imaging array; and
    processing information from the imaging array to produce a final still or moving picture, the processing being performed based on the first and second measurements.

16. The method for capturing still or moving pictures as recited in claim 15, further comprising a step of capturing radiation from a broader part of a visible scene with at least one of the first and second pixels than is captured by any imaging array pixel.

* * * * *